United States Patent [19]

Kagan

[11] 3,736,379

[45] May 29, 1973

[54] INDUCTIVE DATA COUPLER

[75] Inventor: Claude Ancelme Roichel Kagan, Hopewell Township, Mercer Cty., N.J.

[73] Assignee: Western Electric Company, Incorporated, New York, N.Y.

[22] Filed: Oct. 8, 1971

[21] Appl. No.: 187,642

[52] U.S. Cl. ..................................179/2 C, 179/1 C

[51] Int. Cl. .........................H04m 11/00, H04m 1/00

[58] Field of Search ........................179/2 C, 1 C, 82, 179/1 PC, 2 DP, 96, 175.1; 336/175, 107, 174; 324/127; 339/154, 156

[56] References Cited

UNITED STATES PATENTS

| | | | |
|---|---|---|---|
| 3,624,282 | 11/1971 | Salaman et al. | 179/2 DP |
| 2,925,570 | 2/1960 | Strock | 336/175 |
| 1,309,253 | 7/1919 | Lowe | 179/96 |
| 3,668,324 | 6/1972 | Firestone | 179/1 PC |

*Primary Examiner*—Kathleen H. Claffy
*Assistant Examiner*—Alan Faber
*Attorney*—W. M. Kain, J. B. Hoofnagle, R. C. Winter et al.

[57] ABSTRACT

A data terminal is inductively coupled to a telephone line without the need to make any physical connection to the line. In one embodiment, the invention comprises a slim unit containing a pair of flat coils which fits between the jack and plug of a jack-ended telephone. The prongs of the jack pass through the central aperture of the coils, thereby inductively coupling the line to the coils. The coils, in turn, are connected to the modem associated with the data terminal.

5 Claims, 6 Drawing Figures

INVENTOR
C.A.R. KAGAN
By Bryan W. Sheffield
ATTORNEY

INDUCTIVE DATA COUPLER

BACKGROUND OF THE INVENTION

1. Field of the Invention

Broadly speaking, this invention relates to data communications. More particularly, in a preferred embodiment this invention relates to methods and apparatus for inductively coupling a data terminal to a telephone line, and which avoids the necessity of establishing a direct electrical connection between the data terminal and the telephone line.

2. Discussion of the Prior Art

In the early days of computers, data terminals were invariably "hard-wired" to the computer by a direct electrical connection. Later, as the advantages of centralized computer processing came to be recognized, data terminals came to be located at considerable distances from the computer which serviced them. Connection with the computer was established by means of either a private, leased line, or over the switched telephone network. In either case, it was necessary to provide both ends of the line with a telephone-company supplied modem, for example, a Western Electric Data-Phone data-set, or more recently, with a customer supplied modem.

The ever increasing trend towards miniaturization has led to a new generation of data terminals which may truly be called portable. These devices, some of which are small enough to fit into a suitcase, may also be connected to a computer by the use of a leased Data-Phone data-set, and the switched telephone network. This, of course, requires a direct electrical connection between the modem and the data terminal. This connection is invariably covered by tariffs filed with the appropriate regulatory agencies and involves a modest charge to the user. Unfortunately, the use of a permanently wired modem reduces the mobility, and hence the usefulness, of such portable data terminals. Accordingly, much attention has been given lately to the development of so-called "acoustical couplers."

An acoustical coupler is a device having a small loudspeaker and a small microphone so positioned that, when the hand-set of a standard telephone instrument is pressed into engagement therewith, an acoustical coupling is established between the loudspeaker of the acoustical coupler and the carbon transmitter of the telephone set and between the receiver of the telephone set and the microphone of the acoustical coupler. The acoustical coupler may also include audio amplifiers to boost the level of the audio-frequency signals, as well as the modulating and demodulating circuitry required to convert the d.c. signals from the data terminal into audio-frequency signals suitable for transmission over the telephone network.

Communication with the computer is established by first, dialing up the telephone number of the Data-Phone data-set at the distant computer center, in the normal manner, and, once the data-set at the distant end signals its readiness to accept data, placing the telephone hand-set on the acoustical coupler to establish the aforesaid acoustical couplings and, hence, a communications link between the data terminal connected to the acoustical coupler and the computer.

Unfortunately, the carbon granule transmitter invariably found in standard telephone instruments, while satisfactory for voice communication, leaves much to be desired for data communication. For example, as is well known, carbon granule microphones have an inherently high noise level, a limited and uneven frequency response, and are highly sensitive to physical shock. In addition, carbon granule transmitters are not designed to be held in a horizontal position for extended periods of time. Thus, if placed in an accoustical coupler for more than a few minutes the carbon granules in the transmitting element may "pack," still further degrading the response of the device to data signals.

For the above reasons, the transmission of data through an acoustical coupler must be effected at a relatively low transmission rate, for example, 300 bauds or less, where one baud corresponds to a transmission rate of 1 binary digit (bit) per second. Another objection to the use of an accoustical coupler is the fact that the telephone hand-set will pick up extraneous room-noise which may obliterate information signals, or cause the printing of erroneous messages. In any event, since from a theoretical standpoint, a telephone line is capable of accommodating data transmission rates of 2,000 bauds or higher, the use of an acoustical coupler is clearly wasteful of the data transmission capabilities of the switched telephone network.

Because of the inherent limitations of accoustical couplers, attempts have been made to inductively couple modulated audio information, through the base of a telephone instrument, to the hybrid transformer therein. However, heretofore such attempts have not been successful. This is due to the fact that: (1) the metal base of the telephone acts as a magnetic shield; and, (2) it is difficult, at the audio frequencies involved here, to couple to the coil of a transformer, unless the coupling coil is wound about, and hence coaxial with, the transformer. Further, although most telephones are two-wire devices, it is advantageous to couple the data terminal to the four-wire side of the hybrid transformer and thereby gain advantage of the isolation and line balancing features of such hybrid transformers. But, this, of course, is impossible if the inductive coupling is attempted through the bottom of the instrument. The coil connecting the hand-set to the main portion of the telephone is, of course, four-wire, but the four wires are twisted into a common cable and cannot be separately accessed without cutting into the cable.

Attempts have also been made to accoustically couple to the transmitter of a telephone hand-set while at the same time inductively coupling to the telephone receiver. Such attempts have also proved to be unsuccessful due to the metallic shielding typically employed in the telephone hand-set, particularly about the receiving element. Variations in the size and shape of telephone hand-set also render the use of acoustic coupling devices awkward.

SUMMARY OF THE INVENTION

As a solution to this problem, one embodiment of the invention comprises an apparatus for connecting a data terminal having a transmitting portion and a receiving portion to a telephone line. The apparatus includes a modulator, connected to the transmitting portion, for converting the coded d.c. output of the transmitting portion into modulated, audio-frequency signals, and a demodulator, connected to the receiving portion for converting incoming, audio-frequency signals into coded d.c. signals. The apparatus also includes first means, connected to the modulator, for inductively coupling the modulated, audio-frequency signals to the telephone line and second means, connected to the demodulator, for inductively coupling incoming, modulated, audio-frequency signals on the telephone line to the demodulator. The apparatus is characterized in that, for use with a telephone line in which the line includes four conductors, grouped into a transmitting pair and a receiving pair, the first inductively coupled means includes at least one coil functionally wound about at least one conductor of the receiving pair, and the second inductive coupling means includdes at least one coil functionally wound about at least one conductor of the receiving pair.

DETAILED DESCRIPTION OF THE INVENTION

Figure 1:
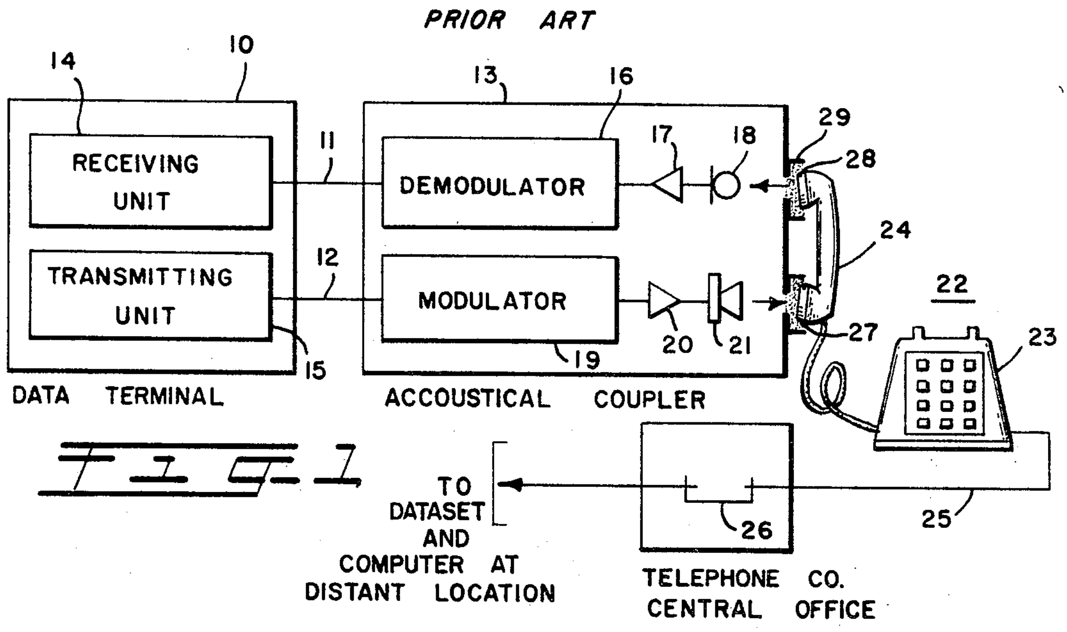
FIG. 1 depicts a prior art acoustical coupler connecting a data terminal to a computer, via the switched telephone network.

FIG. 1 illustrates a typical prior art arrangement in which a data terminal 10, for example, a teletypwriter, is connected via a pair of leads 11 and 122 to an acoustical coupler 13. The data terminal 10 typically includes a data receiver portion 14, for example a typing unit, and a data transmitting portion 15, for example a typewriter keyboard. The receiving portion 14 is connected, via the lead 11, to a demodulator 16 in the coupler 13. The demodulator, in turn, is connected via an (optional) amplifier 17 to a microphone element 18 within the acoustical coupler. In like fashion, the transmitting portion 15 is connected, via the lead 12, to a modulator 19 in the coupler 13. The modulator, in turn, is connected via an (optional) amplifier 20 to a small, loudspeaker 21 in the coupler. A standard telephone instrument 222, including a main portion 23 and a hand-set 24, is connected via a line 25 and a (schematically illustrated) telephone switch 26 to a data-set (not shown) at the remote computer location.

As previously discussed, the telephone hand-set 24 includes a carbon granule microphone 27 and a receiving element 28 and, as shown in FIG. 1, hand-set 24 is pressed into a receiving portion 28, typically of foam rubber, on the acoustical coupler 13. Thus, an acoustic coupling is established between loudspeaker 21 of the acoustical coupler and carbon microphone 27 of the hand-set 24. Similarly, an acoustical coupling is established between receiving unit 28 of hand-set 24 and the microphone 18 of the acoustical coupler. A pair of amplifiers 17 and 20 may be provided in the acoustical coupler to boost the output from microphone 18 and the input to loudspeaker 21, if required, or such amplifiers may be included within demodulator 16 and modulator 19.

Once a connection is established with the data-set at the distant location, operation of the keyboard associated with the data terminal, will cause coded d.c. signals to be transmitted over lead 12 to the modulator 19 where they will be converted into coded audio-frequency signals and applied, after amplification, to loudspeaker 21 of the acoustical coupler. These audio signals, in turn, will be converted by the loudspeaker into audible tones and immediately picked up by carbon microphone 27 of hand-set 24 and, hence, transmitted over the switched telephone netowrk, to the data-set associated with the computer. The audio signals received at the distant terminal will be converted by the distant data-set into the corresponding digital signals and manipulted by the computer in a conventional manner. These same signals, or other signals generated by the computer in response to the signals from the keyboard, will be transmitted back to the data terminal by the corresponding reverse process, and will cause intelligence to be displayed, for example, on the typewriter portion 14 of the data terminal.

To avoid problems caused by echo, and to permit "duplex" operation, the frequencies of the audio signals transmitted to the line by modulator 119 differ from those received by demodulator 16. For example, one widely used arrangement utilizes transmitting frequencies of from 1,070–1,270 Hz, and receiving frequencies of from 2,070–2,270 Hz.

Figure 2:
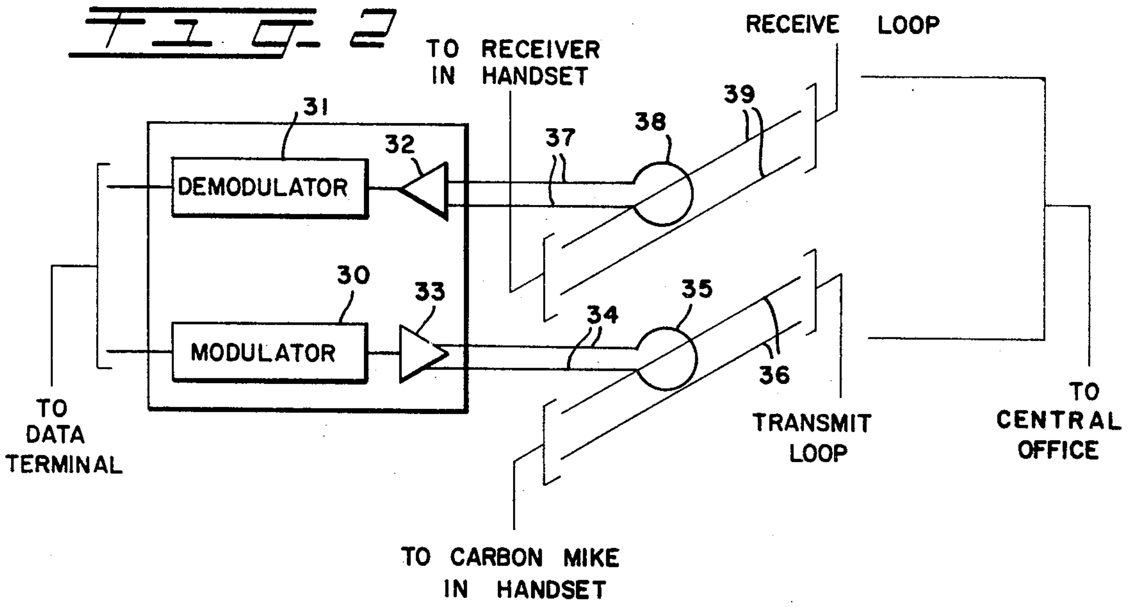
FIG. 2 is a partially diagrammatic, partially schematic illustration of a first embodiment of the invention, showing the principle of operation thereof.

As previously discussed, however, the limiting factor in this arrangement is the ability of carbon microphone 27 to respond to the audio frequency signals applied thereto by loudspeaker 21. Generally, acoustic couplers employ some form of frequency shift keying and, thus, carbon microphone 27 will be called on to respond to rapid, step changes in the audio frequency output of modulator 19. However, as previously stated, carbon granule microphones are incapable of adequately responding to such signals if the rate of data transmission is high and are subject to "packing." Therefore, in accordance with my invention, as shown in FIGS. 2 and 3, the modulated audio frequency signals which, in the prior art example, FIG. 1, are applied to loudspeaker 21, and received by microphone 27, are cou0led to, and received from, the telephone line by means of electromagnetic induction.

Now, it will be recalled that prior art attempts to use inductive coupling were generally unsuccessful. Fortunately, I have overcome these prior art problems, and, accordingly, one element of my invention comprises an inductive coupling device which is designed to fit between the plug and jack of a jack-ended telephone installation. As shown in FIG. 2, in schematic form, one embodiment of the invention, designed for use with a four-wire telephone line, comprises a modulator 30, a demodulator 31 and a pair of amplifiers 32 and 33, all of which are similar in design and operation to the equivalent equipment in acoustical coupler 13 of FIG. 1. The modulator, demodulator and amplifiers may be housed in a separated cabinet, or it may be more convenient to incorporate them within the data terminal itself. Indeed, with modern integrated circuit technology it may also be possible to incorporate these active elements in this latter event, some means for supplying power to the IC devices would be needed. This supply means could be a dry cell battery or an additional pair of leads runnign to some external power source.

The output of amplifier 33 is connected by a pair of leads 34 to a coil 35 which, as will be more fully understood later, is, in effect, wound about one lead of the pair of leads 36 connected (indirectly) to the carbon microphone of the telephone. Similarly, the input to amplifier 32 is connected by a pair of leads 37 to a coil 38 wound about one lead of a pair of leads 39 connected to the receiver of the telephone. One skilled in the art will appreciate that coil 35 could comprise two coils, one wound about one lead of the pair of leads 36, and the other coil wound about the other lead. In that event, the two coils in each pair would be wound in a series-aiding relation. Of course, coil 38 could similarly comprise two separate coils. While the drawing shows a single turn coil, in fact each coil would comprise many turns, the exact number and the gauge of wire depending on such factors as the sensitivity and output of amplifiers 32 and 33. In general, there will be more turns, of finer wire, on the receive coil and fewer turns, but of heavier wire, on the transmit coil, since obviously, the transmit coil will carry a far greater current in operation.

Figure 3:
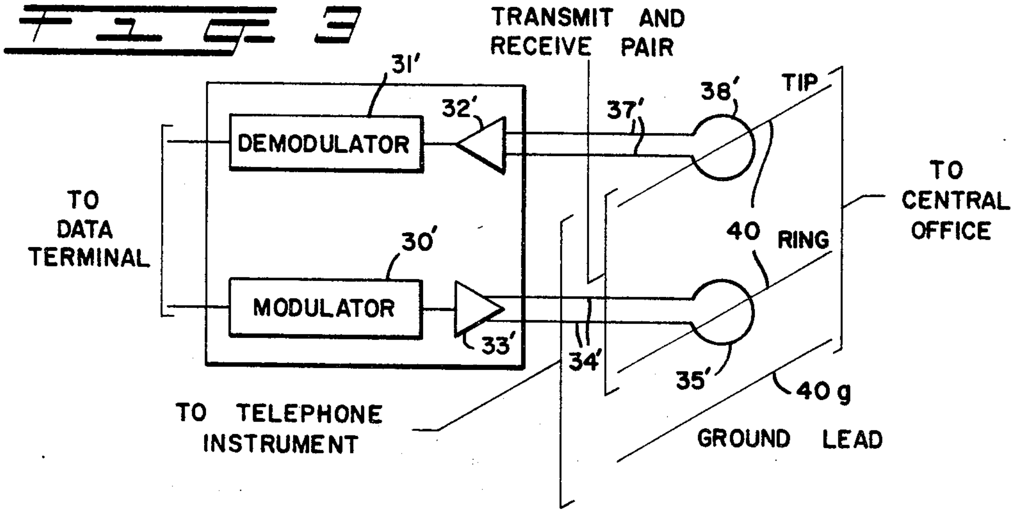
FIG. 3 is a partially diagrammatic, partially schematic illustration of a second embodiment of the invention for use with "two-wire" telephone instruments.

FIG. 3 illustrates what is, perhaps, the most common arrangement, i.e., a "two-wire" telephone installation, with the "tip" and "ring" conductors (and a ground lead) extending between the telephone instrument and the telephone plug. As shown, this embodiment is essentially identical to the embodiment shown in FIG. 2 and will not be described in detail. Suffice it to say, that instead of two distinct pairs 36 and 39, in the embodiment of FIG. 3, the telephone cable comprises a single pair 40 (having a "tip" conductor and a "ring" conductor) and a ground wire 40*g*. The receive coil 38' is effectively wound about the "tip" conductor of pair 40 and the transmit coil 35' is effectively wound about the "ring" conductor of pair 40. Any energy introduced into the "ring" conductor will, of course, be coupled, eventually, into the "tip conductor. However, since the modulator 30' and demodulated 31' are operated at different frequencies, no interference will result. For that reason, coil 35' and 38' could both be wound about the same conductor, or by the use of some frequency selective network, could even physically comprise the same coil.

Figure 4:
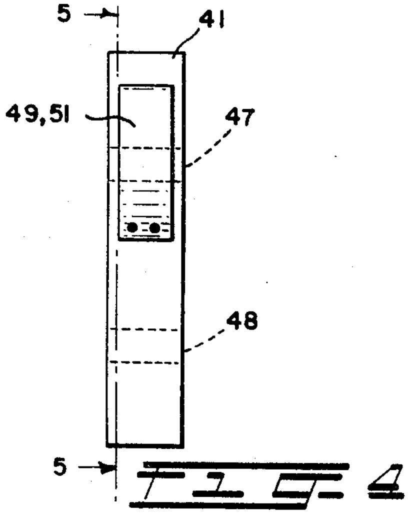
FIG. 4 is a cross-sectional view of an inductive data coupler according to this invention.
Figure 5:
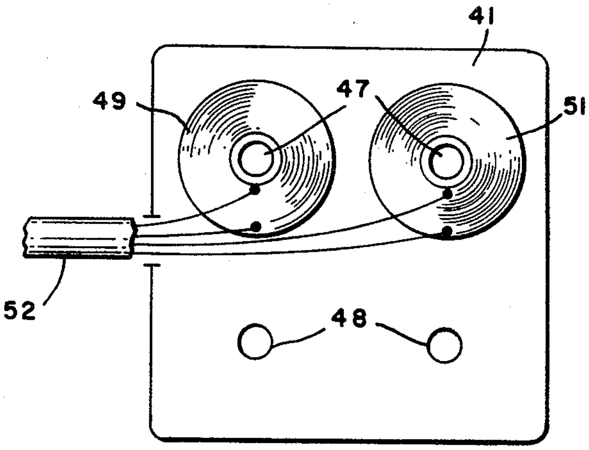
FIG. 5 is a cross-sectional view taken about line 4—4 of the coupler shown in FIG. 4.
Figure 6:
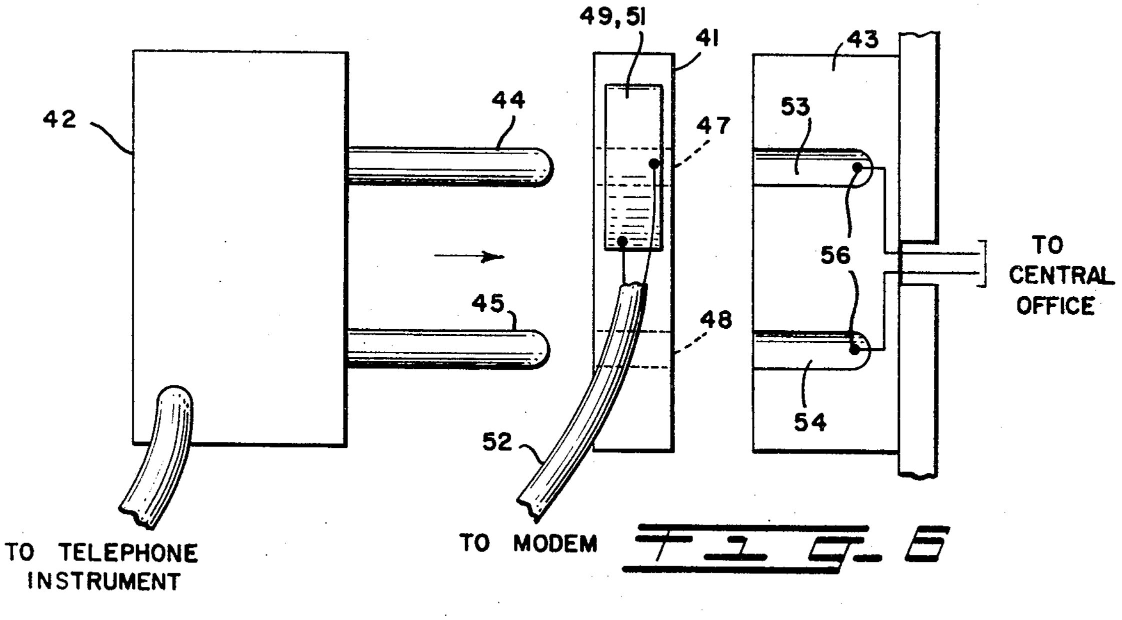
FIG. 6 is a partially cross-sectional, and partially side view of the coupler shown in FIG. 2, when interposed between the plug and jack of a conventional telephone.

Turning now to FIGS. 3–5, in implementation, not in principle, one practical embodiment of the invention comprises a flat housing 41, fabricated for convenience, of plastic, which is designed to fit between the plug 42 and jack 43 of a conventional jack-ended telephone. As is well known, plug 42 includes two pair of pin connectors 44 and 45 which are typically positioned in the housing asymmetrically so that the plug cannot be inserted incorrectly. The housing 41 includes two pair of apertures 47 and 48 which respectively align with the pins 44 and 45 of plug 42, when housing 41 is interposed between the plug 42 and a telephone wall jack 43. The housing further includes a first coil 49 which is wound about one of the apertures 47 and a second coil 51 wound about the other aperture 47. The ends of these coils are brought out, through the side of the device, into a cable 52 which connects to the amplifiers 32,32'–33,33', FIG. 1, thence, to the data terminal.

Jack 43 contains two pair of recessed apertures 53 and 54, which align with the pins 44 and 45 of plug 42 when it is pressed into engagement therewith. Each of the recessed apertures 53 and 54 is provided with some suitable connector, for example, a coil connector 56, and the incoming telephone wires are connected with said coil connectors to established a connection, via the pins 44 and 45 with the telephone instrument. The above assumes the jack connection is four-wire.

In operation, housing 41 is aligned with the apertures in the jack 43 and plug 42, in turn, is aligned with the housing 41. The plug is then pushed into mating engagement with the jack and the pins 44 and 45 will pass through respective apertures 47 and 48 in housing 41. Thus, an incoming audio signal passing through one of pins 44 to the instrument, and returning therefrom through a corresponding one of the pins 45, or the other pin 44 if "two-wire," will establish an electromagnetic field in, say, coil 49. This magnetic field, in turn, will induce an alternating potential in the coil, which, after suitable amplification and demoddulation, may be used to drive the receiving portion, of the data terminal, as discussed above. In like manner, the output from the data transmitter, after audio modulation and amplification, will be connected to, say, coil 51. This will induce an alternating current in the pin around which the coil is effectively "wound." This alternating current will be fed, via the dial-up telephone line, to the data-set at the distant location, to actuate the computer thereat.

One skilled in the art will appreciate that the invention is not limited to use with digital apparatus but is equally well suited for transmission between analog devices. For example, the portable electro-cardiogram machines currently available may be connected, via the coupler of this invention, to a corresponding electro-caridogram receiving device at some distant location, which itself may be connected to the telephone line via the instant device. It should be noted that *no direct electrical connection* is made between the device and the telephone company line. For clarity, the scale of the drawing has been slightly exaggerated. It is, of course, necessary that the coupler be thin enough so that the interposition of the device between the jack and the plug will not affect the direct electrical connection needed for normal telephone use.

One skilled in the art could make various changes and substitutions to the illustrative embodiments shown without departing from the spirit and scope of the invention.

What is claimed is:

1. Apparatus for inductively coupling a data terminal to a telephone line, which comprises:

a housing having a plurality of apertures therein for receiving the prongs of a telephone plug; and at least one coil in said housing positioned about at least one of said apertures, for establishing an inductive coupling between said coil and one of said prongs, when said plug is pressed into engagement with said housing so that the prongs thereof pass through the apertures in said housing.

2. The apparatus according to claim 1 wherein said plug has four prongs, two of said prongs connecting to a transmitting pair in said telephone line and the other two prongs connecting to a receiving pair in said telephone line, and the apparatus further comprises:

at least one first coil associated with the pair of prongs connected to said receiving pair; and at least one second coil associated with the pair of prongs connected to said transmitting pair, whereby two separate inductive couplings are established when said prongs are passed through said apertures.

3. Apparatus for inductively coupling, at audio frequencies, a data terminal to a telephone line, said telephone line terminating in a jack for connection to a plug-ended telephone instrument, which comprises:

a housing having a plurality of apertures therein, said apertures aligning with corresponding plug receiving apertures in said jack, when said housing is interposed between said plug and said jack;

the prongs of said plug passing through said apertures and into the plug receiving apertures of said jack, when said plug is inserted into said jack; and at least one coil in said housing, said coil being coaxially positioned with respect to one of said apertures, so that the corresponding prong of said plug passes through the at least one coil, whereby an inductive coupling is established between said coil and the prong of said plug.

4. Apparatus for inductively coupling a data terminal, having means for generating and means for receiving modulated audio-frequency data signals, to a telephone line in which a transmitting pair and a receiving pair are connected through a multi-prong plug and a matching jack, which comprises:

a housing having a plurality of apertures therein aligned with the apertures of said jack for removable interposition between said plug and said jack;

a first coil mounted in said housing to encircle a first prong of said plug, when said housing is interposed between said plug and said jack, said first prong connecting one of the conductors of said transmitting pair, said first coil being connected to said generating means; and a second coil mounted in said housing to encircle a second prong of said plug, when said housing is interposed between said plug and said jack, said second prong connecting one of the conductors of said receiving pair, said second coil being connected to said receiving means.

5. Apparatus for inductively coupling a data terminal, having means for generating and means for receiving modulated audio-frequency data signals, to a telephone line including at least a "tip" conductor and a "ring" conductor connected through a multi-prong plug and a matching jack, which comprises:

a housing having a plurality of apertures therein aligned with the apertures of said jack for removably interposing between said plug and said jack;

a first coil, mounted in said housing to encircle a first prong of said plug, when said housing is interposed between said plug and said jack, said first prong connecting said "tip" conductor, said first coil being connected to said receiving means; and a second coil, mounted in said housing to encircle a second prong of said plug, when said housing is interposed between said plug and said jack, said second prong connecting said "ring" conductor, said second coil being connected to said transmitting means.

* * * * *